United States Patent

Myers, Jr.

[15] 3,674,917

[45] July 4, 1972

[54] FREQUENCY SELECTING SYSTEM

[72] Inventor: William N. Myers, Jr., Huntington Beach, Calif.

[73] Assignee: American Micro-Systems, Inc., Santa Clara, Calif.

[22] Filed: Feb. 24, 1971

[21] Appl. No.: 118,396

[52] U.S. Cl. ....................178/2 R

[51] Int. Cl. ....................H04l 15/00

[58] Field of Search....................178/2 R, 88; 340/171; 324/78

[56] References Cited

UNITED STATES PATENTS 3,478,318 11/1969 Rorholt....................178/2 R

*Primary Examiner*—Kathleen H. Claffy
*Assistant Examiner*—William A. Helvestine
*Attorney*—Smyth, Roston & Pavitt

[57] ABSTRACT

This invention relates to a computer system for selecting the rate of presentation of a plurality of digital signals from a particular number of rates stored in the computer. During a particular number of digital signals such as the first two digital signals in a sequence, clock signals are introduced to a counter. Every time that the counter overflows, the frequency of the clock signals is reduced by an arithmetic factor and a count is inserted into the counter in accordance with the reduction in the frequency of the clock signals. At the end of the particular number of digital signals, the computer determines the rate of the digital signals from the count in the counter and the frequency of the clock signals and selects, from the particular number of rates stored in the computer, the rate closest to the determined rate. The computer then resets the count in the counter and selects the frequency of the clock signals in accordance with the selected rate of the digital signals.

14 Claims, 3 Drawing Figures

INVENTOR:
William N. Myers, Jr.

By Smyth, Roston & Pavitt
ATTORNEYS

INVENTOR:
William N. Myers, Jr.
By Smyth, Roston & Pavitt
ATTORNEYS

INVENTOR:
William N. Myers, Jr.
By Smyth, Roston & Pavitt
ATTORNEYS

FREQUENCY SELECTING SYSTEM

This invention relates to a system for determining the rate at which a plurality of digital signals are provided. The invention particularly relates to a system for counting the number of clock signals at progressively decreasing frequencies during the occurrence of a particular number of digital signals and for determining the rate of occurrence of the digital signals in accordance with the number of clock signals counted during the occurrence of the particular number of digital signals. The invention further relates to a computer system for selecting a particular rate for subsequent digital signals from a preselected number of different rates in accordance with the number of clock signals counted during the occurrence of the particular number of digital signals.

As computer systems become increasingly complex, they receive digital signals from, or supply signals to, an increasing number of remote terminals each of which provides individual information to the computer or receives individual information from the computer. The digital signals may be supplied to the computer from the remote terminals, or supplied by the computer to the remote terminals, on a multiplexed basis or on a random basis in accordance with communications between the remote terminals and the computer. The digital signals supplied to or received from different ones of the remote terminals may occur at individual rates. Unless the computer and its associated peripheral equipment operate at the same rate as the remote terminals operate, proper communications between the computer and the remote terminal will be impossible.

When each individual one of the remote terminals has been selected in the past, various attempts have been made in the past to determine at the computer the rate at which digital signals are provided or received at the remote terminal so that proper communication can be automatically established between the remote terminal and the computer at such rate. Such attempts have not been entirely successful. Because of this, automatic communication has not occurred between the computer and the individual ones of the remote terminals when the remote terminals have been selected.

This invention provides a system for overcoming the above disadvantages. In the system constituting this invention, clock signals at a plurality of frequencies are provided each having an arithmetic relationship to the other frequencies in the plurality. For example, each frequency may be one-half of the next highest frequency. The clock signals at the highest frequency are initially introduced to counting means to provide a count of such signals in the counting means. Every time that the counting means overflows, the count in the counting means is reduced by one-half and clock signals at the next lowest frequency are introduced to the counting means. At the end of a particular number of digital signals from the remote terminal, the count of the clock signals in the counter means is terminated.

On the basis of the count in the counter means and the frequency of the clock signals at the end of the count, the computer then selects a particular frequency for the clock signals and further selects in the counter means a particular count. The selected clock frequency and the selected count in the counter represent the rate at which the digital signals are being introduced from the remote terminal. This particular rate represents the closest rate, among a number of different rates stored in the computer, to that determined during the particular number of digital signals from the remote terminal. This particular count is introduced to a second counter means which thereafter receives the clock signals at the selected frequency.

The clock signals introduced to the second counter means cause the count in the second counter means to decrease. This count is compared with the count in the first counter means. When the count in the second counter means reaches a value which is one-half of the value in the first counter means, the midpoint in the occurrence of a digital signal is reached. At such a time, the digital significance (either a binary "1" or a binary "0") of the digital signal being received from the remote terminal is determined. When the count in the second counter reaches a value of "0," the count in the second counter means is reset to the particular count so that a new cycle of operation can be initiated for the next digital signal.

The system described above may include a computer and a plurality of modems (modulators/demodulators). The computer and the plurality of modems may illustratively be included in systems providing for the transmission and reception of telegraph codes. As will be appreciated, there are a number of different telegraph codes each providing individual sequences of signals to represent different characters such as the letter "*a*." These different codes provide at individual frequencies sequences of signals representing the different characters. The system of this invention selects the frequencies of the digital signals representing the characters of the individual codes and provides for the transmission between the computers and the individual modems of the information represented by such characters.

IN THE DRAWINGS

Figure 3:
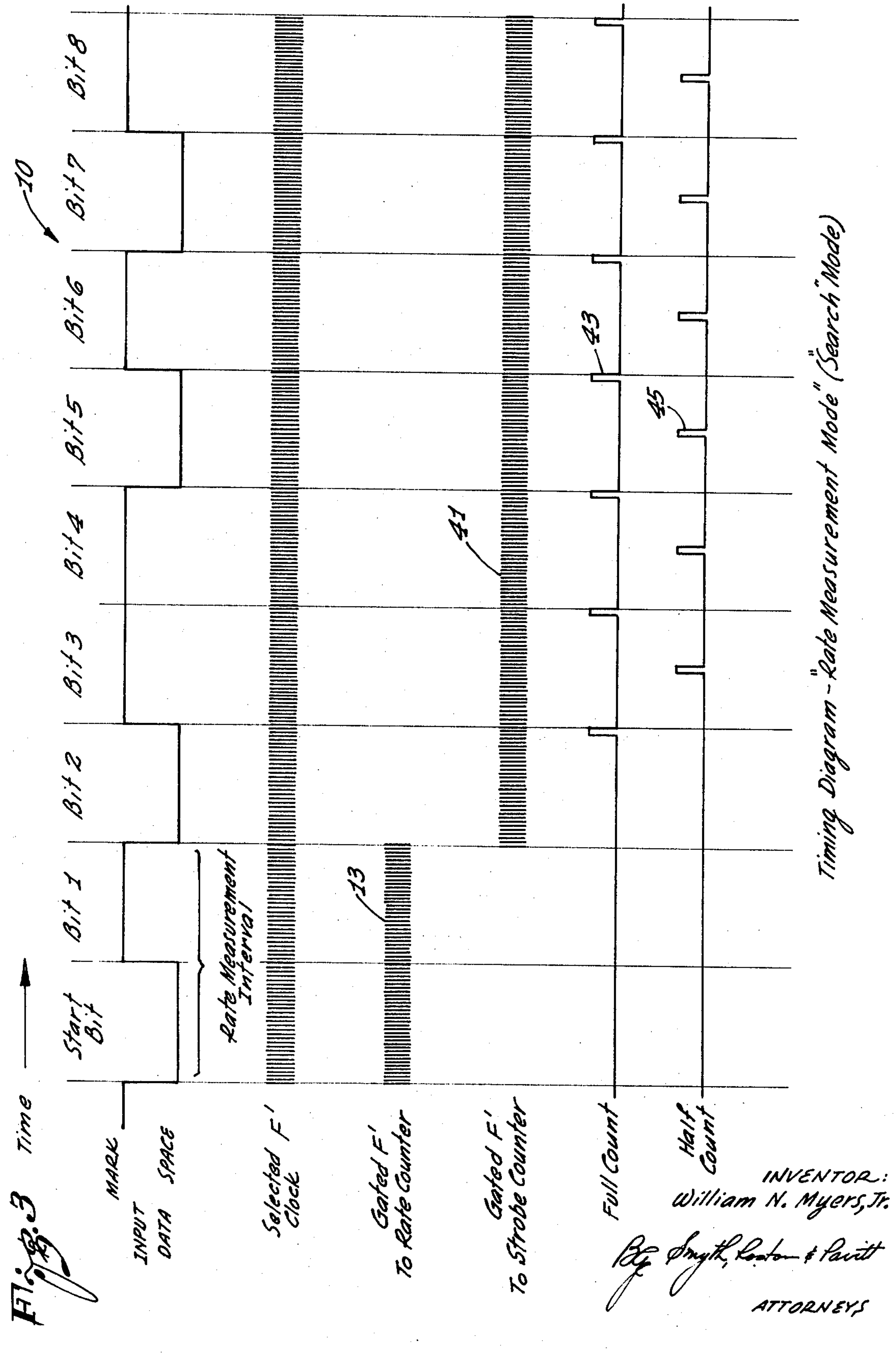
FIG. 3 constitutes curves illustrating the operation of the sub-system shown in FIG. 2.

In one embodiment of the invention, a sequence of digital signals are generally indicated at 10 in FIG. 3. The sequence of signals 10 may include a "Start bit" and successive bits generally indicated as "bit 1" through "bit 8." In the system constituting this invention, the rate of providing the successive bits is determined during the period between the beginning of the "Start bit" and the end of "bit 1."

Pluralities of the successive bits may represent successive characters. For example, "bit 2" to "bit 8," inclusive, in FIG. 3 have a particular sequence of binary "1's" and "0's" to represent a particular character such as the letter "*a*." In successive bits such as bits 9 through 15, another character such as the letter "*i*" may be represented by a particular sequency of binary "1's" and binary "0's." The successive indication of the characters "*a*" and "*i*" in bits 2 to 15, inclusive, may represent a particular telegraph code such as the "Datapoint" code. Similarly, the "Executone" code may be represented by a successive indication of the characters "*a*" and "*e*" in bits 2 through 15 and the "Selectric" code may be represented by a successive indication of the characters "*a*" and "*k*" in bits 2 through 15.

Figure 2:
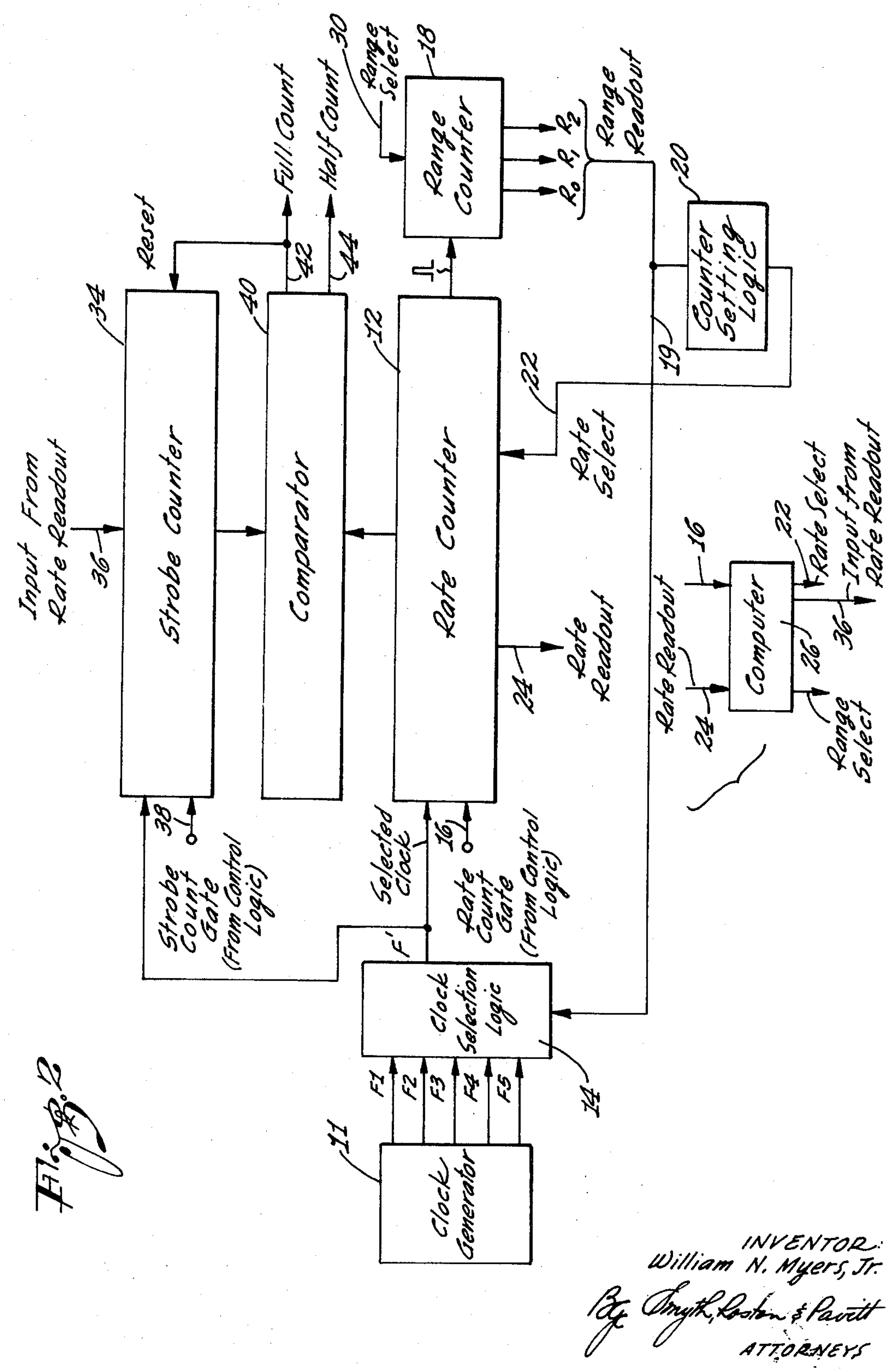
FIG. 2 is a circuit diagram, essentially in block form, showing in further detail, on a sub-system basis, one of the blocks included in the system shown in FIG. 1.

Individual codes may provide the successive digital signals at different rates. One of the functions of the system of this invention is to determine during the "Start pulse" and "bit 1" the rate at which the successive digital signals are presented. For this purpose, a clock generator 11 is adapted to provide clock signals at a frequency F1 and at frequencies F2, F3, F4 and F5 arithmetically related to F1 and to one another. For example, the relationship between the various frequencies from the clock generator may be as follows:

$F2 = \frac{1}{2} F1;$ $F3 = \frac{1}{2} F2;$ $F4 = \frac{1}{2} F3;$ $F5 = \frac{1}{2} F4.$ In the sub-system shown in FIG. 2, signals at the frequency F1 may be initially introduced to a rate counter 12 in accordance with the operation of clock selection logic 14, these signals being indicated at 13 in FIG. 3. The counter 12 may be standard and may be constructed to store a number having a suitable capacity such as eight binary bits. The number stored in the counter 12 represents the number of clock signals introduced to the counter from the generator 10. The counter is operative only during the "Start" bit and bit 1 in accordance with a signal applied to the counter from a line 16.

If the rate counter 12 should overflow during the period of time between the beginning of the "Start" bit and the end of bit 1, an overflow signal flows from the counter 12 to a range counter 18. The range counter 18 may have a suitable capacity such as a capacity of three binary bits. The range counter 18 accordingly counts the number of times that the rate counter 12 overflows.

Every time that the range counter 18 receives a signal from the rate counter 12, it introduces a signal through a line 19 to the clock selection logic 14 to change the frequency at which clock signals are introduced to the rate counter 12. For example, the frequency of the clock signals changes from F1 to F2 the first time that the rate counter 12 overflows. Similarly, the frequency of the clock signals introduced to the rate counter 12 progressively decreases to F2, F3, etc., as the rate counter 12 overflows on successive occasions.

When the counter is receiving clock signals at the frequency F1 and overflows, the overflow signal passing to the range counter 18 causes the range counter to produce a signal which is introduced through counter selection logic 20 to a line 22 leading to the rate counter 12. This signal sets the counter 12 to a value dependent upon the frequency of the clock signals being introduced to the counter prior to the overflow. For example, the counter 12 is set to a value equal to one-half of the capacity of the counter when the counter overflows at the time that it is receiving the clock signals at the rate F1. This results from the fact that the counter thereafter receives clock signals at the frequency F2 and would have been half filled if it had been continuously receiving signals at this frequency instead of the frequency F1. Similarly, the counter 12 becomes set to a value equal to one-half of its capacity when it overflows at the time that it is receiving clock signals at the frequency F2. This results from the fact that the counter 12 thereafter receives signals at a rate F3 and would have been half filled if it had been receiving signals at the rate F3 instead of the rate F2.

At the end of bit 1, the signal on the line 16 changes to a level which prevents any further signals from being introduced to the rate counter 12 from the clock generator 10. This level of signal on the line 18 causes the count in the rate counter 12 to pass through a line 24 to a computer 26 so that the computer can determine the count in the counter. The computer is then programmed to select a number closest to the count passing to the computer through the line 24. In combination with the count in the range counter 18, the number selected by the computer 26 represents the rate at which the digital signals indicated at 10 in FIG. 3 are being provided. This count is entered by the computer 26 into the rate counter 12 through the line 22.

The computer also inserts into the range counter 18 a number which thereafter controls the rate at which the clock signals are introduced to the rate counter 12. This number is inserted into the counter 18 through a line 30 to set the counter to a value which passes through the line 19 to the clock selection logic 14 to control the rate at which the clock signals are introduced to the counter 12 from the generator 10.

Under most circumstances, the number set by the computer 26 into the counter 18 through the line 30 corresponds to the number previously set into the counter by the overflows from the rate counter 12. Under certain circumstances, however, the number set into the counter 18 by the computer may be different from the number previously set into the counter by the overflows from the rate counter 12. For example, when the rate counter is practically full at the end of bit 1, the closest count provided by the computer 26 may correspond to a further overflow in the counter 12 and an increase of the count in the counter 18 by a binary value of "1." Under such circumstances, the count set in the counter 18 by the computer 26 would be greater by a value of "1" than the number of overflows previously introduced to the counter 18 from the counter 12. At the same time, a relatively low value would be introduced into the counter 12 from the computer 26. Similarly, when the rate counter 18 is practically empty at the end of bit 1, the closest count provided by the computer 26 may correspond to a decrease by "1" in the number of overflows to the counter 18 from the counter 12 and substantially a full count in the counter 12.

As will be appreciated, the computer 26 stores a particular number of different rates for the production of the digital signals corresponding to the signals 10 in FIG. 3. Such different rates may correspond to the rates at which telegraph signals are transmitted and received in different codes. By counting the number of clock signals in the period between the beginning of the Start Bit and the end of bit 1, the computer is able to select, from the particular number of different rates stored in the computer, the rate which most closely approximates that determined by the circuitry shown in FIG. 2 for the period between the initiation of the Start Bit and the end of bit 1.

The operation described above has certain important advantages. Since the computer 26 selects a preprogrammed number closest to the number counted during the period of the Start bit and bit 1, there does not have to be any concern about the effect of noise signals on the count. The reason is that such noise signals will not affect the count to such a significant extent as to make the count closer to one of the numbers stored in the computer other than the number which correctly represents the rate at which the digital signals 10 are being introduced.

The number set by the computer 26 into the rate counter 12 through the line 24 is also set by the computer into a strobe counter 34 through a line 36. The strobe counter 34 receives a signal through a line 38 to make the counter inoperative during the Start bit and bit 1 and to make the counter operative only from the beginning of bit 2. Starting with bit 2, the strobe counter 34 receives the clock signals passing from the generator 11 in accordance with the operation of the clock selection logic 14 and counts down to a value of "0." The frequency of the clock signals introduced to the strobe counter 34 has been previously set by the computer 26 as disclosed in detail above. The signals received by the strobe counter 34 are indicated at 41 in FIG. 3. When the counter reaches a value of "0," the comparator produces a signal on a line 42, as indicated at 43 in FIG. 3. This signal represents the end of each successive one of the digital signals 10 and causes data stored in registers to be shifted by one position, as will be described in detail in connection with the system shown in FIG. 1. The signal produced on the line 42 also causes the counter 34 to be reset to the value originally preset into the counter by the computer 26.

The dynamic count in the counter 34 is compared by a comparator 40 with the count preset into the counter 12 by the computer 26. When the count in the counter 34 reaches a value equal to one-half of the value preset into the counter 12, the comparator 40 produces a signal on a line 44. The comparator 40 is able to provide such a signal since the shifting of the count in the counter 12 by one digit in the direction of decreased significance causes the shifted count from the counter 12 to correspond to the count in the counter 34 when the count in the counter 34 reaches a value equal to one-half of the value preset into the counter. The signal provided by the comparator on the line 44 occurs at the midpoint in time of each of the digital signals 10 so that the binary value of each such digital signal can be safely read. The signal provided by the comparator on the line 44 is indicated at 45 in FIG. 3.

Figure 1:
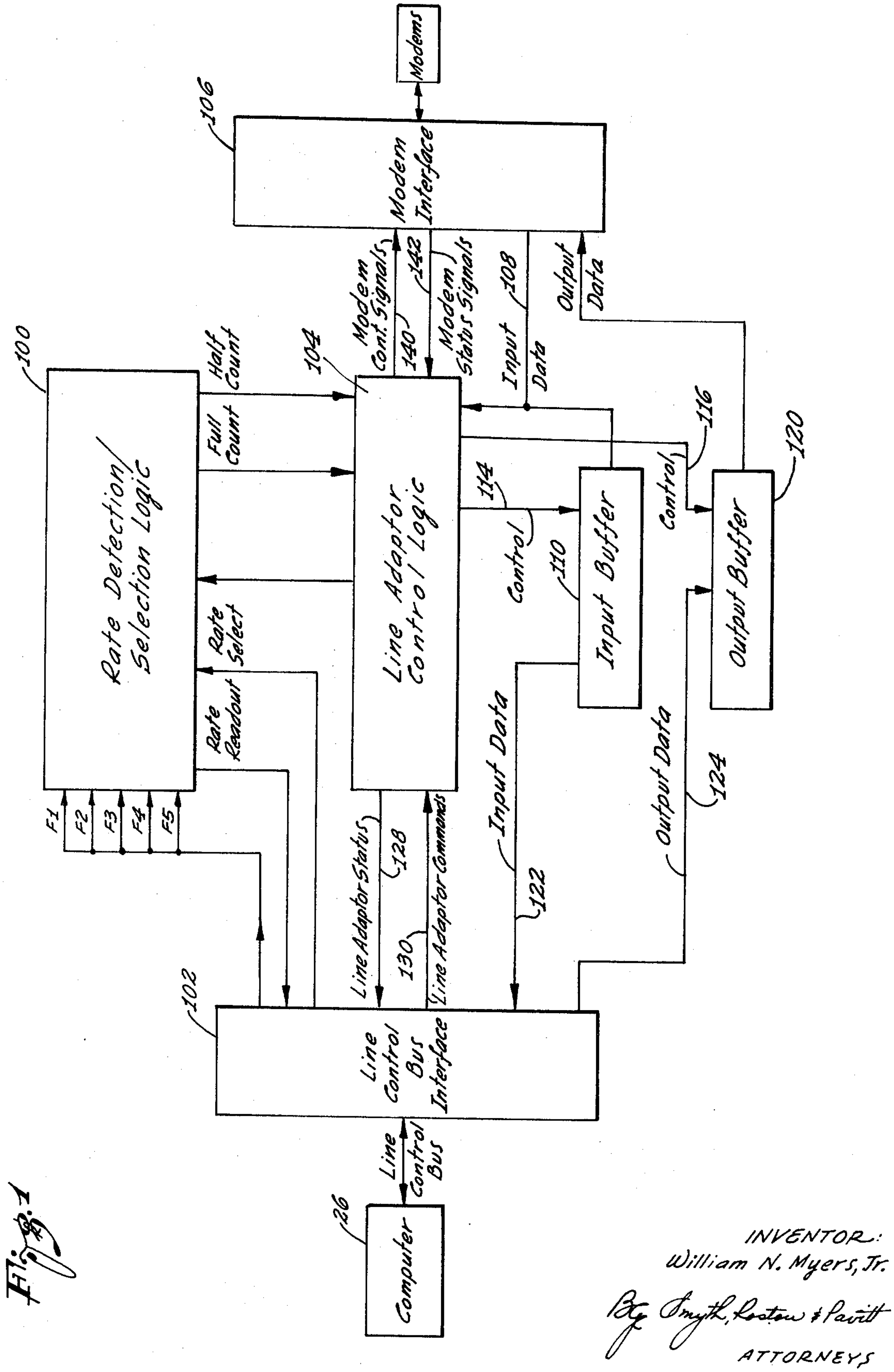
FIG. 1 is a circuit diagram, essentially in block form, of a system constituting one embodiment of the invention.

The sub-system shown in FIG. 2 and described in detail above is shown in FIG. 1 as a block 100 labelled "Rate Detection/Selection Logic." Input lines to the "Rate Detection/Selection Logic" include the clock signals F1, F2, F3, F4 and F5 and Rate Select lines (22 in FIG. 2) and output lines include the "Full Count" line (42 in FIG. 2) and the "Half Count" (44 in FIG. 2) line and the "Rate Readout" line (24 in FIG. 2).

The F1, F2, F3, F4 and F5 lines and the Rate Readout and Rate Select lines are connected through a "Line Control Bus Interface" 102 to the computer 26. The "Full Count" and "-Half Count" lines are connected to "Line Adaptor Control Logic" 104. The control logic 104 receives input data from modems (modulators/demodulators) through a modem interface 106. The input data from the modems pass in serial form through the modem interface 106 to an input line 108, which introduces the input data to the line adaptor control logic 104 and to an input buffer 110. The input buffer 110 stores such input data.

Upon each occurrence of a signal on the "Half Count" line to indicate the midpoint in one of the digital signals 10, the line adaptor control logic 104 reads the digital signal introduced to it through the line 108. When a signal is produced on the "Full Count" line to indicate the end of the digital signal, the line adaptor control logic 104 shifts such information to a position of decreased digital significance.

When the line adaptor control logic 104 has stored a number of signals representing a full character such as the letter "*a*," the line adaptor control logic produces control signals on lines 114 and 116. The lines 114 and 116 are respectively connected to the input buffer 110 and an output buffer 120.

The input buffer 110 receives the digital signals 10 in serial form through the modem interface 106 from the modems and stores such digital signals in parallel form. When a control signal is produced on the line 114, the input buffer signals the computer 26 that it has collected information representing a character. This information is withdrawn in parallel to the computer through a line 122 and the line control bus interface 102.

The output buffer 120 receives from the computer information representing a character. This information is received in parallel form through a line 124 from the computer. When the line adaptor control logic 104 detects that a full character has been stored in the output buffer, it provides a control signal on the line 116. This information in the output buffer 120 is then transmitted serially through the modem interface 106 to the modems.

The production of the control signals on the lines 114 and 116 may be under the control of the computer 26. For example, when a number of digital signals representing a full character has been stored in at least one of the buffers, the line adaptor control logic may introduce to the computer 26 through a line 128 a signal indicating that information representing a full character has been stored in the buffer. The computer may then introduce a signal on a line 130 to the line adaptor control logic to indicate that the information representing the character should be read out of the buffer.

In like manner, modem control signals may be introduced from the line adaptor control logic through a line 140 to the modem interface and modem status signals may be introduced to the line adaptor control logic through a line 142 from the modem interface. These signals control the passage of signals from the output buffer 120 through the modem interface to the modems when information representing a character has been stored in the line adaptor control logic 104.

It should be appreciated that the system shown in FIG. 1 represents on a schematic basis a system which has been known in the art. FIG. 1 has been included in part to show the interrelationship between the rate detection/selection logic and the other sub-system elements in the system shown in FIG. 1.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for determining the rate at which a plurality of digital signals are provided, means for providing pluralities of signals each having a particular algebraic relationship in frequency to the other pluralities of signals, counting means operative to a particular count, means for initially introducing signals in the plurality of highest frequency to the counter to obtain a count of such signals by the counter, means responsive to each particular count in the counting means for resetting the counting means to a particular count dependent upon the ratio between the frequency of the signals being introduced to the counting means and the next lowest frequency in the pluralities of signals, means responsive to each particular count in the counting means for thereafter providing for the introduction of signals at the next lowest frequency to the counting means, and means for interrupting the count in the counting means upon the introduction of a particular number of digital signals to the counting means.

2. The combination set forth in claim 1 wherein computing means are responsive to the count in the counting means, upon the interruption of the count in the counting means, for setting into the counting means a count dependent upon the count in the counting means and the frequency of the signals being introduced to the counting means at the time of the interruption of the count in the counting means.

3. The combination set forth in claim 2 wherein the counting means are responsive, after the setting of the count into the counting means by the computing means, to pluralities of signals to vary the count in the counting means in accordance with the signals in such pluralities and wherein means are responsive upon each occurrence of a first particular count in the counting means to provide an indication of the value of a successive one of the digital signals.

4. The combination set forth in claim 2 wherein the counting means are reset to the count provided by the computing means every time that the count in the counting means reaches a second particular count.

5. In combination for determining the rate at which a plurality of digital signals are provided, counting means, means for introducing to the counting means a plurality of clock signals at variable rates of frequencies arithmetically related to one another, means responsive to each count of a particular value in the counting means, during the introduction of a particular number of digital signals, for reducing the rate at which the clock signals in the plurality are introduced to the counting means and for resetting the count in the counting means in accordance with the reduction in the frequency at which the clock signals in the plurality are introduced to the counting means, and means responsive to the count in the counting means and the rate at which the clock signals in the plurality are introduced to the counting means at the end of the particular number of digital signals for thereafter resetting the count in the counting means and the rate at which the clock signals in the plurality are introduced to the counting means so that the rate determined for the digital signals will conform to the closest one of a particular number of rates for the digital signals.

6. The combination set forth in claim 5 wherein the counting means are responsive to the signals introduced to the counting means, after the introduction of the particular number of signals, to vary the count in the counting means and wherein means are responsive, upon each occurrence of a first particular count in the counting means, to provide an indication of the value of successive ones of the digital signals in the plurality.

7. In combination for determining the rate at which a plurality of digital signals are provided, first means for providing pluralities of clock signals each having a frequency arithmetically divisible relative to the other frequencies, counter means for counting the clock signals provided by the first means and for providing an overflow indication upon each occurrence of a particular count in the counter means, second means responsive to each overflow indication from the counter means for providing for the introduction of clock signals at the next lowest frequency, third means responsive to each overflow indication from the counter means for resetting the count in the counter means to a value related to the ratio between the frequency of the clock signals previously introduced to the counter means and the frequency of the clock signals provided by the second means, fourth means responsive to the introduction of a particular number of digital signals for interrupting the count provided by the counter means, and computer means responsive to the rate of the digital signals being introduced to the counter means at the time of the interruption of the count in the counter means, as measured by the third and fourth means for resetting the count in the counter means and the frequency of the clock signals in accordance with the relationship between the rate of the digital signals selected by the computer means and the rate of the digital signals determined by the third and fourth means and for providing for the introduction of clock signals to the counter means at the selected clock frequency.

8. The combination set forth in claim 7 wherein means are responsive to the setting of the count in the counter means by the computer means for decreasing this count in accordance with the introduction of clock signals at the frequency set by the computer means and wherein means are responsive to each decrease of the count in the counter means to a setting of zero for resetting the count in the counter means in accordance with the introduction of the next one of the digital signals in the plurality, and wherein means are responsive to each decrease of the count in the counter means to a particular value for indicating the value of each successive one of the digital signals in the plurality.

9. In combination for determining the rate at which a plurality of digital signals are provided, first means for providing for the introduction of clock signals at a plurality of frequencies each arithmetically related to the others, second means for initially providing for the introduction of the clock signals at the highest frequency and for thereafter providing for the introduction of the clock signals at progressively decreasing frequencies, counter means responsive to the clock signals from the first means for providing a count of such signals and for providing an overflow upon each occurrence of a particular count in the counter means, third means responsive to each occurrence of an overflow in the counter means for operating upon the second means to provide for the introduction to the counter means of the signals of a progressively decreased frequency, fourth means responsive to each occurrence of an overflow in the counter means for resetting the counter means in accordance with the arithmetical relationship of the frequency of the signals previously introduced to the counter means and the signals subsequently introduced to the counter means, and fifth means responsive to the count in the counter means and to the frequency of the clock signals being introduced to the counter means at the end of a particular number of digital signals for selecting a rate for the digital signals closely related to that represented by the count in the counter means and to the frequency of the clock signals being introduced to the counter means at the end of the particular number of digital signals and for resetting the count in the counter means in accordance with the rate selected for the digital signals and for selecting a frequency for the clock signals in accordance with the count reset in the counter means.

10. The combination set forth in claim 9 wherein second counter means are set to a particular count in accordance with the setting of the count in the first counter means by the fifth means and wherein the clock signals are introduced to the second counter means to decrease the count in the second counter means after such setting of the second counter means and wherein comparator means are responsive to a particular relationship between the count in the first and second counter means to provide an indication of the value of the digital signal being provided in the plurality at that instant.

11. The combination set forth in claim 10 wherein means are provided for resetting the count in the second counter means to the particular count upon each decrease of the count in the second counter means to zero.

12. In combination in a system for determining the particular one of a plurality of telegraph codes being transmitted at each instant where the different characters are represented by a plurality of sequentially transmitted digital signals and where the digital signals for the different codes are transmitted at individual frequencies and where first digital signals in the plurality are provided to determine the rate at which the signals are being transmitted, first means for providing pluralities of clock signals each having a frequency arithmetically related to the frequencies of the other pluralities of clock signals, counter means responsive to the clock signals for providing a count of the clock signals and for providing an overflow signal upon each occurrence of a particular count in the counter means, second means responsive to each overflow of the count in the counter means for providing for the introduction to the counter means of clock signals at the next one of the progressively reduced frequencies, third means operative at the end of the first digital signals for selecting the telegraph code having a rate most closely approximating the rate represented by the frequency of the clock signals being introduced to the counter means at the end of the first digital signals and the count in the counter means, fourth means operative at the end of the first digital signals for inserting into the counter means a count dependent upon the rate of the signals in the selected telegraph code, fifth means operative at the end of the first digital signals for selecting a frequency for the clock signals dependent upon the rate of the signals in the selected code, sixth means responsive to the clock signals introduced to the counter means at the frequency selected by the fifth means for varying on a cyclic basis the count inserted into the counter means, and seventh means responsive to each occurrence of a particular count in the counter means for determining the value of a successive one of the digital signals in the plurality.

13. The combination set forth in claim 12 wherein the counter means include first and second counter means and wherein the first counter means are set to the particular count by the fourth means and wherein the second counter means are set to a particular count in accordance with the setting of the count in the first counter means by the fourth means and wherein the clock signals selected by the fifth means are introduced to the second counter means to decrease the count in the second counter means after such setting of the second counter means and wherein comparator means are responsive to a particular relationship between the count in the first and second counter means to provide an indication of the value of the digital signal being provided in the plurality at that instant.

14. The combination set forth in claim 13 wherein means are provided for resetting the count in the second counter means to the particular count upon each decrease of the count in the second counter means to zero.

* * * * *